United States Patent
Karol et al.

(10) Patent No.: US 7,782,787 B2
(45) Date of Patent: Aug. 24, 2010

(54) RAPID FAULT DETECTION AND RECOVERY FOR INTERNET PROTOCOL TELEPHONY

(75) Inventors: Mark John Karol, Fair Haven, NJ (US); Parameshwaran Krishnan, Basking Ridge, NJ (US); Juan Jenny Li, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 879 days.

(21) Appl. No.: 10/953,024

(22) Filed: Sep. 29, 2004

(65) Prior Publication Data

US 2005/0281204 A1    Dec. 22, 2005

Related U.S. Application Data

(60) Provisional application No. 60/581,329, filed on Jun. 18, 2004.

(51) Int. Cl.
*G01R 31/08* (2006.01)
(52) U.S. Cl. .................. 370/248; 370/216; 370/241; 370/282; 370/395.21
(58) Field of Classification Search .............. 370/216, 370/241, 282, 395.21
See application file for complete search history.

(56) References Cited

U.S. PATENT DOCUMENTS 5,933,425 A * 8/1999 Iwata ........................ 370/351
6,512,740 B1 * 1/2003 Baniewicz et al. .......... 370/216
6,895,441 B1 * 5/2005 Shabtay et al. ............. 709/238

(Continued)

FOREIGN PATENT DOCUMENTS

JP    2002044125    2/2002

(Continued)

OTHER PUBLICATIONS

A.P. Markopoulou et al., "Assessment of VoIP Quality Over Internet Backbones," Proc. IEEE Infocom 2002, 10 pages, Mar. 2002.

(Continued)

*Primary Examiner*—Jason E Mattis
*Assistant Examiner*—Kibrom T Hailu
(74) *Attorney, Agent, or Firm*—Joseph B. Ryan; Jason Paul DeMont; Wayne S. Breyer (57) ABSTRACT

Techniques for performing rapid fault detection and recovery in communication networks are disclosed. For example, in one aspect of the invention, a technique for detecting one or more conditions in a communication network comprises the following steps/operations. One or more keep-alive packets are transmitted from a source node in the communication network to a destination node in the communication network over two or more paths between the source node and the destination node, wherein the two or more paths are at least partially disjoint. Upon receipt of the one or more keep-alive packets at the destination node via the two or more paths, at least one quality measure is computed at the destination node for each of the two or more paths, the at least one quality measure being indicative of one or more conditions in the communication network. While not limited thereto, the invention is particularly well-suited to Internet Protocol (IP) telephony networks, particularly those that provide Voice over IP (VoIP) applications.

6 Claims, 2 Drawing Sheets

U.S. PATENT DOCUMENTS

| | | | | |
|---|---|---|---|---|
| 7,043,250 | B1* | 5/2006 | DeMartino | 455/445 |
| 2002/0004843 | A1* | 1/2002 | Andersson et al. | 709/238 |
| 2002/0071391 | A1 | 6/2002 | Ishioka | |
| 2002/0075873 | A1 | 6/2002 | Lindhorst-Ko et al. | |
| 2002/0093948 | A1* | 7/2002 | Dertz et al. | 370/355 |
| 2002/0150041 | A1* | 10/2002 | Reinshmidt et al. | 370/216 |
| 2003/0061340 | A1 | 3/2003 | Sun et al. | |
| 2003/0133417 | A1* | 7/2003 | Badt, Jr. | 370/254 |
| 2003/0187847 | A1* | 10/2003 | Lubbers et al. | 707/9 |
| 2004/0160904 | A1* | 8/2004 | Enomoto et al. | 370/256 |
| 2004/0233847 | A1* | 11/2004 | Park et al. | 370/235 |

FOREIGN PATENT DOCUMENTS

| | | |
|---|---|---|
| JP | 2003258902 A | 9/2003 |
| JP | 2004007361 A | 4/2004 |
| JP | 2004159146 A | 6/2004 |

OTHER PUBLICATIONS

C. Boutremans et al., "Impact of Link Failures on VoIP Performance," Proc. NOSSDAV Workshop (ACM Press), pp. 1-6, May 2002.

M. Bearden et al., "Assessing Network Readiness for IP Telephony," Proc. 2002 IEEE Int. Conf. on Communications, 9 pages, Apr. 2002.

M. Karol et al., "VoIP Network Failure Detection and User Notification," Proc. 2003 Int. Conf. on Computer Communications and Networks, pp. 1-13, Oct. 2003.

T. Greene et al., "Users Find a Smarter Way to Route," Network World Fusion, www.nwfusion.com, 4 pages, Jul. 2002.

M. Karol et al., "enProtect: Enterprise-Based Network Protection and Performance Improvement," Proc. Int. Conf. on Internet Computing, 5 pages, Jun. 2003.

A. Banerjea et al., "Simulation Study of the Capacity Effects of Dispersity Routing for Fault Tolerant Realtime Channels," Proc. ACM SIGCOMM, 12 pages, 1996.

A. Albanese et al., "Information Dispersal to Improve Quality of Service on the Internet," Proc. SPIE, vol. 3529, pp. 14-25, Dec. 1998.

P. Ramanathan et a., "Delivery of Time-Critical Messages Using a Multiple Copy Approach," ACM Trans. Computer Systems, vol. 10, No. 2, pp. 144-166, May 1992.

M. Karol et al., "VoIP Protection and Performance Improvement," Proc. 2003 Int. Conf. on Computer Communications and Networks, pp. 505-510, Oct. 2003.

D.G. Andersen et al., "Resilient Overlay Networks," Proc. 18th ACM Symp. on Operating Systems Principles, 15 pages, Oct. 2001.

EP Searth Report for EP 05 25 3643, Nov. 9, 2005.

Sawai et al., "A Study on Measurement of One-Way Characteristics for End-to-End Path Selection", "IPSJ SIG Notes", Mar. 7, 2003, vol. 2003, No. 21, Publisher: Information Processing Society of Japan, Published in: JP.

Ginese, Salvatore, "CA Application No. 2 508 545 Office Action Nov. 9, 2009", , Publisher: CIPO, Published in: CA.

Ginese, Salvatore, "CA Application No. 2 508 545 Office Action Mar. 13, 2009", , Publisher: CIPO, Published in: CA.

"EP Application No. 05 253 643.0 Examination Report Nov. 12, 2007", , Publisher: EPO, Published in: EP.

"EP Application No. 05 253 643.0 Examination Report Mar. 22, 2006", , Publisher: EPO, Published in: EP.

Andoh, K., "JP Application No. 2005-177179 Office Action Apr. 27, 2009", , Publisher: JPO, Published in: JP.

Andoh, K., "JP Application No. 2005-177179 Office Action Aug. 17, 2009", , Publisher: JPO, Published in: JP.

Andoh, K., "JP Application No. 2005-177179 Office Action Mar. 23, 2010", , Publisher: JPO, Published in: JP.

* cited by examiner

RAPID FAULT DETECTION AND RECOVERY FOR INTERNET PROTOCOL TELEPHONY

CROSS REFERENCE TO RELATED APPLICATION(S)

This application claims priority to the U.S. provisional patent application identified as Ser. No. 60/581,329 and filed on Jun. 18, 2004, the disclosure of which is incorporated by reference herein.

FIELD OF THE INVENTION

The present invention generally relates to communication networks such as Internet Protocol (IP) telephony-based networks and, more particularly, to techniques for performing rapid fault detection and recovery in such networks.

BACKGROUND OF THE INVENTION

There is increasing interest in IP telephony to help lower costs and enable new services. Many enterprises and call centers are adopting IP telephony over their converged IP infrastructure and many multi-site corporations are using Voice over IP (VoIP) for their intra- and inter-site communication.

With the use of VoIP for mission-critical business applications, it is important to evaluate and improve the reliability and quality of VoIP calls. Ideally, a VoIP call should be as reliable as a traditional circuit-switched phone call. However, when monitoring and evaluating the quality of a VoIP call (especially over wide area links), it is necessary to deal with the inherent packet losses, delays, and jitter associated with IP networks, which are not encountered in traditional circuit-switched networks. Even though IP networks are largely self-healing for network faults, and many enterprise networks are engineered to have redundant links or paths between sites, today's IP networks are not engineered to react to performance degradations at the timescales needed for voice. For example, recent studies show that while there is acceptable performance within some service provider networks, many backbone paths still have poor VoIP performance and network faults cause problems.

To provide a robust VoIP infrastructure, it is important to rapidly detect performance degradations and faults. This detection is complicated by several factors. On a per-connection basis, for example, there are natural silence periods in VoIP calls during which packets are not transmitted by a source (e.g., when a participant in a call is listening rather than speaking). Consequently, while monitoring a VoIP call (e.g., on the receiving side) it is necessary to distinguish between gaps that occur due to natural speech silences and perhaps speech compression, and the gaps that occur due to packet loss, delay, and jitter in the IP network. Furthermore, although detecting problems can certainly help to alert a network manager, it would be particularly useful if the network could react to a detected problem and route around it.

Accordingly, there is a need for techniques for performing rapid fault detection and recovery in communication networks such as IP telephony networks, particularly those that provide VoIP applications.

SUMMARY OF THE INVENTION

The present invention provides techniques for performing rapid fault detection and recovery in communication networks. While not limited thereto, the invention is particularly well-suited to IP telephony networks, particularly those that provide VoIP applications.

For example, in one aspect of the invention, a technique for detecting one or more conditions in a communication network comprises the following steps/operations. One or more keep-alive packets are transmitted from a source node in the communication network to a destination node in the communication network over two or more paths between the source node and the destination node, wherein the two or more paths are at least partially disjoint. Upon receipt of the one or more keep-alive packets at the destination node via the two or more paths, at least one quality measure is computed at the destination node for each of the two or more paths, the at least one quality measure being indicative of one or more conditions in the communication network.

Further, the quality measures may be compared for each of the two or more paths. Results of the comparisons may be transmitted from the destination node to the source node. One or more communication packets may be transmitted from the source node based on at least a portion of the received results.

Thus, by way of example and in accordance with an illustrative embodiment, short, low-bandwidth keep-alive packets can be injected into VoIP packet streams to rapidly detect faults and deteriorating network conditions (e.g., increasing delay, jitter, or loss). The keep-alive packets can be duplicated and also used to continuously monitor and compare the delay and loss characteristics of primary and alternate network paths, and thereby help control the rapid switchover of calls (in-progress and future) to alternate routing paths (or the circuit-switched PSTN) when faults or deteriorating QoS conditions are detected. By simultaneously transmitting copies of keep-alive packets over multiple paths to make the differential delay measurements and comparisons, the techniques avoid many common synchronization and timing errors.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that while the present invention will be described below in the context of an IP telephony-based network having VoIP capability, the invention is not so limited. That is, the present invention is more generally applicable to any communication network in which it would be desirable to provide detection of one or more conditions in the communication network.

Before providing illustrative details of an implementation of the techniques of the invention in the context of an IP telephony-based network with VoIP capabilities, principles of the invention will be described from a more general communication network perspective.

Assume that there is a network of communication nodes. This may be an IP telephony-based network with VoIP capabilities. However, this may also include the special case of a signalling network. Further assume that there is an underlying routing algorithm that routes communication packets from source communication nodes to destination communication nodes (any particular communication node might both be a source and a destination for different communication sessions). For example, the communication packets might be VoIP packets. Still further, the communication packets might be signalling packets. Examples of signalling packets may include error messages, call requests and interrupt requests.

In accordance with principles of the invention, some of the communication nodes also are equipped to serve as pacemaker/measurement/routing (PMR) nodes, as will be explained in detail below. Such PMR functions, for example, could be implemented in a gateway. In addition, there can be some standalone PMR nodes.

Further, in accordance with principles of the present invention, a source PMR node injects or transmits keep-alive PMR packets to a destination PMR node along two or more paths that differ in at least one node or link (i.e., the two or more paths are at least partially disjoint). Keep-alive packets are additional, short packets transmitted on a regular basis in order to "keep alive" (i.e., eliminate long idle gaps in) the communications between the source node and the destination node. The keep-alive PMR packets receive the same type of quality-of-service (QoS) within the network as the communication packets that are delivered in the network. The keep-alive PMR packets might be simultaneously injected along the two or more paths. The keep-alive PMR packets may be transmitted on a regular basis (regular intervals)—all the time (i.e., with or without calls between a source PMR node and a destination PMR node), continuously with calls, only during silence periods within calls, or only during idle periods between calls. The rate at which keep-alive PMR packets are transmitted can be different for different pairs of source PMR nodes and destination PMR nodes. The transmission along two or more paths may be via tunnelling through one or more intermediate PMR nodes (i.e., PMR nodes between the source PMR node and the destination PMR node). The transmission along two or more paths may be by appropriately setting header address bits (which influence the routing of packets). The transmission along two or more paths may be via a sequence of overlay PMR nodes.

Still further, in accordance with principles of the present invention, QoS measures (e.g., delay, jitter, loss) of the two or more paths may be compared at the destination PMR node. The QoS comparison may be via relative receive times, thereby avoiding the need to synchronize clocks at the source PMR node and destination PMR node. The QoS comparison takes into account various delay, jitter, and loss measures appropriate for the associated types of communication packets (e.g., delay and jitter might be more important for VoIP packets, whereas loss might be more important for signalling packets).

Yet further, in accordance with principles of the present invention, information from the QoS comparison at the destination PMR node may be communicated back to the source PMR node and may be used to influence the paths of future communication packets from the source communication node to the destination communication node. The paths of communication packets could be changed for future calls set up or, if desired, even for ongoing, existing sessions of communication packets. The paths could be changed via tunnelling through one or more intermediate PMR nodes, via overlay PMR networks, or via changing routing tables in the underlying routing algorithm. For reliability, the QoS comparison information could be communicated from the destination PMR node back to the source PMR node over multiple paths.

We turn now to an illustrative VoIP implementation of the above principles of the present invention.

I. Introduction

Principles of the present invention provide techniques for using short, low-bandwidth keep-alive packets that can be injected into VoIP packet streams to rapidly detect conditions such as faults and deteriorating network conditions such increasing delay, jitter, or loss. While the terms "short" and "low-bandwidth" will depend on the particular network application, and the invention is not limited to any particular packet length or bandwidth value, one example of short, low-bandwidth keep-alive packets may include 32 bit SDES RTCP (Source Description Real-time Transmission Control Protocol) packets with an overhead of less than 0.2 percent.

We describe how the keep-alive packets can be duplicated and also used to continuously monitor and compare the delay and loss characteristics of primary and alternate network paths, and thereby help control the rapid switchover of calls to alternate routing paths when faults or deteriorating QoS conditions are detected. Specifically, by rapidly switching/sending calls to better alternate paths (with lower delay, loss, or jitter characteristics), the inventive techniques can help: (i) improve the QoS of in-progress calls; (ii) failover route in-progress calls around a detected fault; and (iii) failover route future calls around faults. Based on the detected conditions in the IP network, the techniques can even be used to switch calls over to the traditional circuit-switched PSTN when desired or necessary.

Before VoIP traffic is added to a network, it is important to first determine if the desired QoS is in fact attainable (for an anticipated traffic mix). For example, an initial network assessment can help determine if a network is properly configured. In this illustrative implementation, we assume that the bandwidth, configurations, and settings of the network are in fact sufficient and correct to provide the desired QoS for the anticipated traffic. The inventive techniques are then used to monitor and control the ongoing connections using low-bandwidth keep-alive packets that are sent over primary network paths and, for comparison, alternate network paths. Essentially, the packets monitor and detect deviations from the norm caused by faults and unanticipated (even if temporary) traffic conditions. The inventive techniques not only detect network problems, they also help determine appropriate control responses (e.g., to route around congestion and faults).

In Section II, we illustratively describe the inventive detection, monitoring, and control techniques. In Section III, we illustratively present some generalizations and architectural and implementation issues. In Section IV, we provide greater mathematical detail and present some analytical results to validate the inventive concepts. In Section V, we provide an illustrative hardware implementation. In Section VI, we present an illustrative summary and discuss some extensions.

II. Detection and Monitoring for Control

In this section, we introduce a low-bandwidth technique for detecting network faults and QoS problems. One key concept in the architecture/technique provided in accordance with the invention is the concept of detection and monitoring for control. In contrast, some network monitoring techniques detect network conditions and problems but they provide little or no guidance in the appropriate control responses to the faults. After presenting a low-bandwidth rapid detection method, we will describe a method for rapid control responses to deteriorating network conditions and faults. Our control method will, in turn, motivate a monitoring scheme that avoids many of the common issues in path QoS monitoring for VoIP.

A. Low-Bandwidth Detection

For rapid detection of network faults and QoS impairments at a receiver, the invention provides for transmitting by the sender a low-bandwidth keep-alive signal along with VoIP streams. For instance, along with the VoIP (e.g., RTP or Real-time Transmission Protocol) packets, short keep-alive packets can be sent at regular, "fixed" intervals (e.g., every 500 milliseconds). For detecting network faults alone, these packets need be transmitted only during silent periods in VoIP calls; at other times the RTP packets themselves can be used for fault detection purposes. The sender increases the number of keep-alive packets when the number of RTP packet decreases (during silent periods), making sure that at least one RTP or keep-alive packet is sent every T seconds. Specifically, additional (short) keep-alive packets are injected at rate $R=1/T$ during silent periods in the RTP stream.

At the receiver, a failure is declared if neither RTP nor keep-alive packets are received within a window of $kT$ seconds ($k=2, 3, \ldots$). The receiver then notifies the users who are involved in the sessions, plus, perhaps, other users that might be affected if they were to attempt to set up a new call. Since the RTP and keep-alive packets experience network jitter and loss, there is a chance that a failure will be wrongly declared (i.e., a "false alarm"). However, as soon as either an RTP or a keep-alive packet is once again received, the receiver cancels its "failure announcement." This serves to either: (i) correct a false alarm; or (ii) announce restoration after an actual failure. In other words, (i) states that false alarms automatically self-correct as soon as the next successful RTP or keep-alive packet is received.

Many specific implementation issues are addressed in M. Karol, P. Krishnan, and J. J. Li, "VoIP Network Failure Detection and User Notification," Proc. 2003 Int. Conf. on Computer Communications and Networks, October 2003, the disclosure of which is incorporated by reference herein. In particular, it is shown that if SDES RTCP packets are used as the keep-alive packets, then the overhead in such an implementation is less than 0.2 percent. Other options exist including the use of proprietary keep-alive signals (e.g., between vendor-specific gateway devices). In actual implementations, the keep-alive packets can be injected by the endpoints (e.g., by IP softphones) or perhaps at VoIP Gateways (for a collection of VoIP calls). However, in implementing these techniques, we want to make sure the IP network treats the keep-alive packets identical to the VoIP (e.g., RTP) packets—using the same routing paths, priorities, etc. —so that the loss and delay experienced by the keep-alive packets will accurately reflect the loss and delay experienced by the VoIP calls. Thus, RTP or RTCP packets can be used as keep-alive packets.

B. Extending to QoS Monitoring

We now turn our attention to low-bandwidth QoS monitoring techniques. We already mentioned that keep-alive packets are injected at a fixed rate $R=1/T$ during RTP silent periods. To monitor the QoS (and rapidly respond to it) during RTP talkspurts, there are two options. First, the low-bandwidth keep-alive packets can be injected even during the talkspurts—at the expense of slightly more bandwidth. That is, the keep-alive packets can be injected at rate $R=1/T$ all the time. Second, if we know that the RTP packets are injected with a high degree of accuracy (for example, every 20 milliseconds), then the RTP packets themselves can be used for the monitoring. In both cases, the receiver is designed to exploit the fact that the sender injects some packets nominally at fixed intervals during both RTP silent periods and RTP talkspurts.

The voice QoS (e.g., MOS score/R-value) depends on the packet loss, jitter, and one-way delay. MOS stands for "Mean Opinion Score." It is one conventional measure used to rate the quality of VoIP. It is a scale that rates the relative quality of voice conversations as subjectively perceived by human users. The R-value is a second commonly used metric.

At the receiver, the packet loss probability is measured by simply counting the number of missing, dropped keep-alive and RTP packets. One-way delay and jitter, however, are more challenging to measure. If the keep-alive (and RTP) packets are transmitted at regularly spaced intervals (and with high priority) on each path, then the spacing between successive packets at the receiver gives an approximate measure of the jitter on each path. To monitor the delay, one can add global "time stamps" to packets when they are transmitted and compare them with a clock when received. This, though, requires accurate timing and synchronization of the sending and receiving nodes. Alternatively, the delay measurement is a lot simpler if we exploit the existence of multiple paths between the sending and receiving nodes; we do this below in Section C.

C. Monitoring for Control

Figure 1:
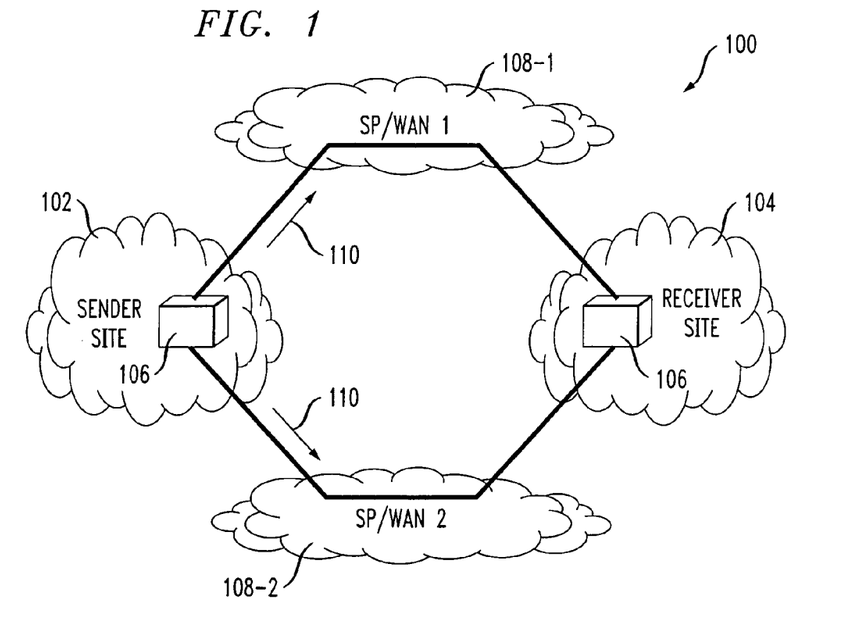
FIG. 1 is a block diagram of a simple model for use in illustrating multiple paths between sender and receiver sites in an IP telephony-based network, in accordance with which an illustrative embodiment of the present invention may be employed.

A focus of the inventive techniques is on the rapid switchover to alternate network paths (or the PSTN) and related performance issues. To motivate the discussion of our control methodology and our analysis, let us assume that in a portion of an exemplary network 100 there are two sites: a sending site 102 and a receiving site 104, as shown in FIG. 1. It should be understood that a "sending site" may also be a "receiving site" for communications in the reverse direction, and a "receiving site" may also be a "sending site" for other traffic.

Suppose the enterprise site connects to multiple Service Providers (SPs) or has multiple wide area network (WAN) links (i.e., a multi-homed architecture) and the enterprise does not have any control of, or information about, the routes/performance in the SPs/WANs, other than perhaps some limited information from service level agreements (SLAs).

Also assume that there is a special (hardware/software) device 106 each at the sending and receiving sides that can monitor the quality of a VoIP stream as received by it, and that can exchange information between them. We refer to such special devices as PMR devices, since they perform three activities: (i) send keep-alive messages (much like a Pacemaker), (ii) Monitor/Measure QoS based on these messages, and (iii) Relay/Route VoIP packets between each other. The PMR devices 106 could be alongside or in the media gateways, in the routers of the network, or alternatively, a signalling server may direct all traffic to and from remote PMR devices.

Now suppose the keep-alive packet (e.g., RTCP) is duplicated at the PMR device 106 on the sending side and simultaneously transmitted over multiple SP/WAN paths (e.g., two paths in a dual-homed architecture, i.e., SP/WAN 1 108-1 and SP/WAN 2 108-2). The duplicates are tagged with an identifier indicating the SP/WAN path along which they have been sent. After traversing the SP/WAN links, the duplicate keep-alive packets 110 reach, for example, an edge router/PMR device at the remote end. Then, various delay, jitter, and loss comparisons are made from reception of the multiple copies. This information can be used to help identify "best" entry/exit points to/from the SPs/WANs and switch VoIP packets to the current "best" path.

A key point here is that, since we are now primarily interested in QoS comparisons for controlling rapid switchover, we simply need to determine, for example, the differential delay and jitter between primary and alternate paths. We avoid synchronization and timing errors because we simultaneously transmit copies of keep-alive packets over multiple paths to make the differential delay measurements and comparisons.

Specifically, the order in which the keep-alive copies arrive indicates the relative magnitude of the delays. The spacing between successive packets at the receiver gives an approximate measure of the jitter on each path, which can be used to determine jitter differences between the two paths. These measurements, averaged over, for example, several seconds, can be used to compare the current QoS characteristics of the various paths. The receiving device sends feedback messages (perhaps copies along multiple paths—for protection) to tell the sender which path to use. Then, for example, calls can be switched over to a (better) IP route (or circuit-switched PSTN) if the jitter, delay, and loss cause the voice quality to drop below acceptable levels. The result is a system that can behave like a simple "smart router," automatically and continually making use of the best (lowest-delay) service provider.

Thus, unlike existing approaches, the inventive approach provides for control/measurement packets to be duplicated for QoS comparison to decide and rapidly switch the path taken by VoIP packets.

D. Improving QoS Comparisons

We now elaborate on more detailed issues associated with making QoS comparisons. For example, with jitter, while packet inter-spacing will give a reasonable idea of path jitter, in reality, there will be some slight variations in the injection times of the keep-alive and RTP packets. However, if this source jitter is less than the amount of network jitter that concerns and interests us, then the above jitter measurements might be sufficient. More important, the inventive techniques (as will be further described below) include other ways to deal with the jitter and delay measurements.

First, as mentioned previously, we are primarily interested in QoS comparisons between multiple paths. The source jitter component is automatically eliminated in our differential delay measurements because the multiple copies of keep-alive packets are simultaneously transmitted. Second, suppose we do want to measure the absolute jitter on a path (e.g., to see if calls should be switched over to the circuit-switched PSTN). Then, we can cancel out many effects of source jitter. Specifically, the sender simply has to measure the amount of source jitter (as it injects its packets over a certain time period) and periodically inform the receiver. The receiver then subtracts this component from its measured (total) jitter to yield an estimate of the network jitter.

Similarly, timing errors (e.g., due to drifting clocks) can also be filtered out using knowledge that the keep-alive packets were nominally injected at fixed intervals simultaneously over the multiple paths.

Finally, if desired, the inventive techniques can be supplemented with occasional measurements of the absolute one-way delays (as done, for example, during an initial network assessment). Starting with knowledge of this initial acceptable state, the inventive techniques can be used to measure the deviations. This information can then be, for example, communicated to a signalling server. If certain delay/jitter/loss thresholds are exceeded and there is only one path between the sender and receiver, then the call could be switched to the PSTN, for example, and/or the set of terminals impacted can be notified that a problem exists. Note that there is no need to make the precise performance measurements all the time; it is sufficient to simply monitor the deviations.

III. Architectural and Implementation Issues

In this section, we extend the basic model in FIG. 1 to show how multi-site enterprises can be modelled and how they can use the inventive techniques.

Figure 2:
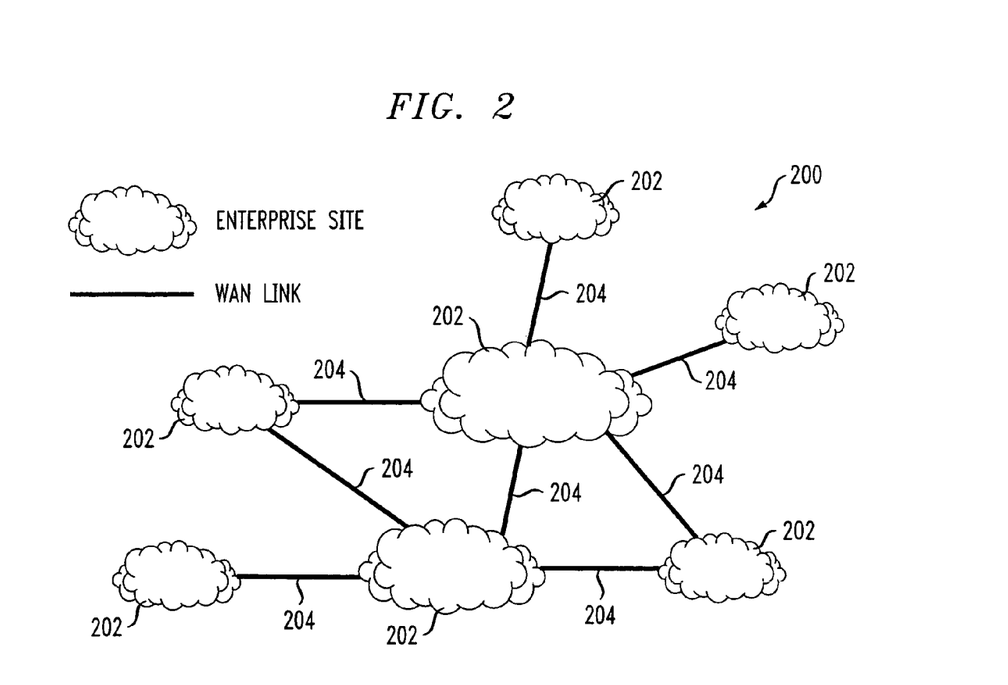
FIG. 2 is a block diagram of an exemplary IP telephony-based network associated with a multi-site enterprise, in accordance with which an illustrative embodiment of the present invention may be employed.
Figure 3:
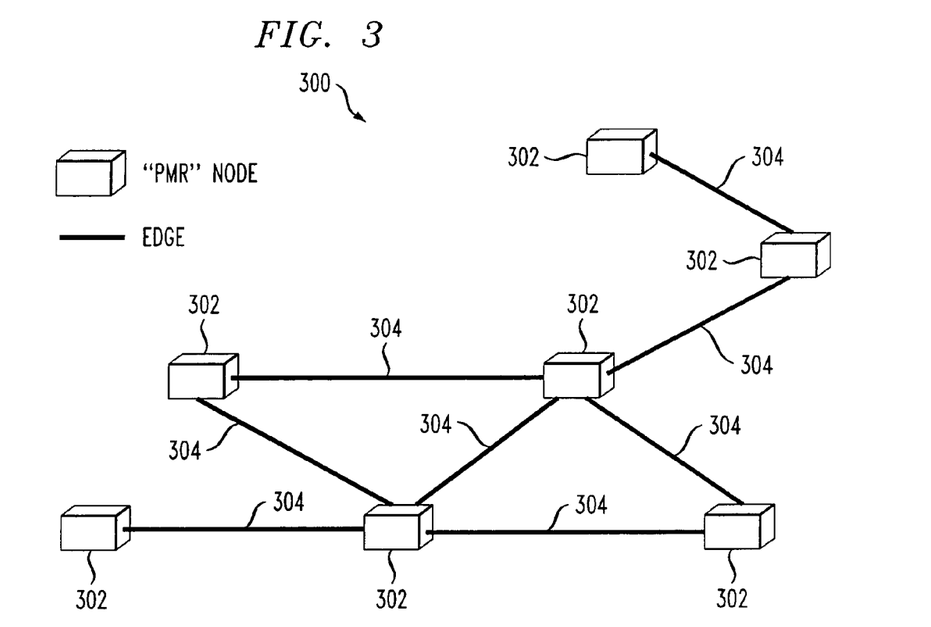
FIG. 3 is a block diagram of an overlay VoIP PMR graph for use in illustrating a fault detection and recovery methodology, in accordance with an illustrative embodiment of the present invention.

Typical enterprise networks have multiple geographically distributed sites connected via leased WAN lines or tunnels. Each site can be thought of as a node of a graph G with the WAN links connecting two nodes being the edges of G. The graph G can be a multi-graph, having multiple edges between two nodes. In this graph, for example, as shown in graph/network 200 of FIG. 2, between nodes 202 there are multiple paths, comprised of one or more links 204, accounting for path redundancy, which is exploited to provide protection. The graph described above forms an overlay network for VoIP. In each node of this graph, in accordance with principles of the present invention, one or more PMR devices are functionally embedded. We refer to the resulting graph/network (with embedded PMRs) as an overlay VoIP PMR graph/network. Such a graph/network 300 is shown in FIG. 3, wherein PMR devices are denoted by reference numeral 302 and edges by reference numeral 304.

Problems in VoIP quality can happen within a node (due to problems within a site), but more commonly due to problems in the edges of G (i.e., due to WAN link problems). The PMRs know the overlay VoIP PMR network and send keep-alive signals along multiple paths. Natural restrictions placed by VoIP (e.g., bounded delay, jitter, etc.) would dictate and limit possible paths that need to be considered for probing; such paths would usually be found, for example, in the assessment phase of VoIP deployment. The PMRs can use techniques from overlay networks and/or tunnelling/address rewriting techniques to divert packets along the "best" VoIP path.

While there are interesting routing issues in overlay VoIP PMR graphs, we note that a focus here is not on overlay networks and the building of the overlay networks. The emphasis here lies in employing low-bandwidth techniques for assessing the health of a VoIP connection, using a method of selective duplication of "detection for control" packets to choose between paths, and using a limited version of overlay network techniques for executing on the decision.

IV. False Alarm Probabilities and Delay Reductions

In this section, we provide some mathematical details to examine some aspects of the inventive system. First, we compute the probability that a failure will be wrongly declared (referred to as a false alarm). The analysis incorporates some aspects of a VoIP talkspurt-silence model to yield a tighter upper bound than in M. Karol, P. Krishnan, and J. J. Li, "VoIP Network Failure Detection and User Notification," Proc. 2003 Int. Conf. on Computer Communications and Networks, October 2003, the disclosure of which is incorporated by reference herein. The analytic results agree well with experimental measurements of the detection times and the false-alarm rates in a prototype implementation. Here, we show how the parameters in the talkspurt-silence model influence the false-alarm probabilities, and we discuss some tradeoffs between the false-alarm probability, the fault detection time (kT), and the rate (R=1/T) at which keep-alive packets are injected. Finally, we evaluate the reduced delay that can be attained using duplicated keep-alive packets to control the rapid switchover to alternate lower-delay paths.

A false alarm occurs if an end-to-end connection is still operational and yet no RTP packets and no keep-alive packets are received (due to packet loss or jitter) during a time interval kT. Since the RTP packets are typically sent (during talkspurts) at a much faster rate (e.g., once every 20 milliseconds) than the keep-alive packets (e.g., once every T=500 milliseconds), it is safe to assume that false alarms will not occur during RTP talkspurts (for typical packet loss probabilities). If all the RTP packets are lost or delayed during, for example, a talkspurt interval of length two seconds (e.g., k=4 and T=500 milliseconds), then a failure has (almost) certainly occurred (otherwise the packet loss rate in the network is too high to provide acceptable VoIP QoS even under normal conditions). Consequently, we just focus on the loss of keep-alive packets in the calculation of a false-alarm probability. We also will neglect the effects of jitter on the keep-alive packets since the spacing T between keep-alive packets is sufficiently larger than the network jitter (which needs to be small enough to provide acceptable VoIP QoS).

Let $f_n$ denote the probability that during transmission of n keep-alive packets, k (or more) successive packets are dropped (which causes a false alarm if the k packets are transmitted during a single silent period in the RTP stream). Due to the relatively large spacing between successive keep-alive packets, we will assume that each packet is independently dropped with probability p. Then $f_n$ is given by the recursion:

$$f_n = f_{n-1} + (1 - f_{n-k-1})(1-p)p^k, n \geq k \quad (1)$$

with initial conditions $f_k = p^k$ and $f_n = 0$ if n<k. Since $f_{n-k-1} \geq 0$, we obtain:

$$f_n < f_{n-1} + (1-p)p^k, n > k. \quad (2)$$

Solving (2) for $f_n$ yields:

$$f_n < p^k[(n-k+1)-(n-k)p], n > k. \quad (3)$$

Thus, we have obtained an upper bound on $f_n$ that can be used to compute an upper bound on the false-alarm probability during a call of duration L. Since we assume that at least one RTP packet will be successfully transmitted during each talkspurt, k successive keep-alive packet losses will not trigger a false alarm if the losses occur during different RTP silent periods. Consequently, to compute the overall false-alarm probability, we first compute the false-alarm probability independently for each RTP silent period of duration longer than kT (i.e., computing the probability that k or more successive keep-alive packets are dropped in a particular length silent period). Then, we obtain an overall false-alarm probability by averaging according to the lengths of the various silent periods throughout the call duration.

Before computing the overall false-alarm probability, we first note that the false-alarm probability depends heavily on the specific probabilistic distribution of the RTP talkspurt and silent periods. For instance, if all the RTP silent periods have duration less than kT, then no false alarms will occur (under the assumptions of this section); since $f_n = 0$ whenever n is less than k, the upper bound correctly shows that the false-alarm probability equals zero (when all the silent durations n are less than k). Likewise, the lengths of the talkspurts also impact the overall false-alarm probability (in particular, by influencing the number of silent periods that occur within a call of duration L).

Let $d_n$ denote the probability that a silent period has a duration between nT and (n+1)T (i.e., such that n keep-alive packets are transmitted during the silent period). The probabilities $d_n$ can be computed, for example, directly from a given on-off VoIP talkspurt-silence model. Then, the probability h that a false alarm occurs during a (random) silent period is given by:

$$h = \sum_{n \geq k} d_n f_n. \quad (4)$$

Finally, the overall false-alarm probability $g_m$ in a call with m (statistically independent) silent periods is given by:

$$g_m = 1 - (1-h)^m. \quad (5)$$

Since [(n−k+1)−(n−k)p]<n, from (3) we see that $f_n < np^k$. Therefore, from (4), we obtain:

$$h < p^k * \sum_{n \geq k} n d_n \leq p^k * \lfloor Y/T \rfloor, \quad (6)$$

where Y is the expected length of an RTP silent period and $\lfloor Y/T \rfloor$ is the largest integer less than or equal to Y/T. Note that $\lfloor Y/T \rfloor$ is the number of keep-alive packets transmitted during a silent period of length Y. Therefore, from (5) and (6) we get:

$$g_m < 1 - \{1 - p^k * \lfloor Y/T \rfloor\}^m. \quad (7)$$

The probability that there are m silent periods during a call duration L can be obtained from the specific VoIP talkspurt-silence model. Here, however, for illustration (and simplicity) we just compute the false-alarm probability g when the number of silent periods m equals its expected value L/(Y+X), where X denotes the expected length of an RTP talkspurt. In (7), setting m=L/(Y+X) yields:

$$g < 1 - \{1 - p^k * \lfloor Y/T \rfloor\}^{L/(Y+X)}. \quad (8)$$

Using (8), we can examine many tradeoffs between the false-alarm probability g, the fault detection time (kT), and the extra bandwidth needed for the keep-alive packets (which is proportional to the rate R=1/T). The specific comparisons depend on the length of the call L, the packet loss rate p, and the expected lengths of the RTP talkspurts and silent periods. For illustration, setting Y=X=10 seconds (i.e., a symmetric call with similar talkspurt and silence durations), Tables 1 and 2 show some representative results for 10-minute calls, a 5% packet loss rate (p=0.05), and fault detection times (kT) of 1 second and 500 milliseconds, respectively. Note that the false-alarm probability g drops very rapidly with increasing k. In contrast, the extra "keep-alive bandwidth" increases linearly with k (if the detection time is held constant).

TABLE 1

Upper Bound on the False-Alarm Probability for 10-minute
calls with a 5% packet loss rate (p = 0.05) and
a fault detection time (kT) of 1 second.

| K | T | "Extra Bandwidth" Factor (1/T) | False-Alarm Prob. g |
|---|---|---|---|
| 3 | 333 ms | 3 | 0.11 |
| 4 | 250 ms | 4 | 0.0075 |
| 5 | 200 ms | 5 | 4.7e−04 |

TABLE 2

Upper Bound on the False-Alarm Probability for 10-minute
calls with a 5% packet loss rate (p = 0.05) and
a fault detection time (kT) of 500 milliseconds.

| k | T | "Extra Bandwidth" Factor (1/T) | False-Alarm Prob. g |
|---|---|---|---|
| 3 | 167 ms | 6 | 0.20 |
| 4 | 125 ms | 8 | 0.015 |
| 5 | 100 ms | 10 | 9.4e−04 |

Finally, we analyze some performance aspects associated with using duplicated keep-alive packets to compare the QoS of alternate paths, and thereby help control the rapid switchover of VoIP calls to best paths. The specific performance gains depend on the rate at which alternate better paths are discovered and the switchover speed. To see what types of performance gains might be possible, here we consider the limiting case of "instantaneous" detection and switchover (i.e., every packet is sent along the current best, lowest delay, path). Such a system is approximated by duplicating the VoIP packets themselves, at the penalty of higher bandwidth, so that one copy of each packet always take the current best path.

Let $X_i$ represent the delay a packet experiences traversing path i. Then, ideally each and every packet is routed along the current minimum delay path and the resultant packet delay X equals the minimum of the $X_i$. That is, in a dual-homed configuration, $X = \min\{X_1, X_2\}$. For various delay models (or real network delay measurements), we can determine (analytically or numerically) the distribution of X. Although realistic network and traffic models are analytically quite complex, simple delay models provide valuable insights and illustrate some important performance features and tradeoffs.

For illustration, consider a dual-homed architecture in which the delay on each path is modelled as the waiting time in a simple M/M/1 queue. Real networks (of queues) are more complex than a simple M/M/1 model; however, the conclusions are qualitatively the same. For path i, $1/\lambda_i$ is the mean interarrival time, $1/\mu_i$ is the mean service time, and the total path load $\rho_i = \lambda_i/\mu_i$. Then, $\text{Prob}\{X_i \leq t\} = 1 - \rho_i * e^{-\mu_i(1-\rho_i)t}$ for ($t>0$) and $\text{Prob}\{X_i = 0\} = 1 - \rho_i$.

Next, suppose $q_i$ denotes the packet loss probability on path i. Then, assuming the two delay distributions are statistically independent (perhaps because the two paths are in different Service Provider networks), we obtain:

$$\text{Prob}\{X \leq t\} = 1 - \text{Prob}\{X_1 > t\} * \text{Prob}\{X_2 > t\} = \quad (9)$$
$$1 - \{(1 - q_1)(1 - q_2)\rho_1\rho_2 * e_1^{-\mu(1-\rho)t} e_2^{-\mu(1-\rho)t}\} -$$
$$\{(1 - q_1)q_2\rho_1 * e_1^{-\mu(1-\rho)t}\} - \{q_1(1 - q_2)\rho_2 * e_2^{-\mu(1-\rho)t}\}$$
and $$\text{Prob}\{X = 0\} = \quad (10)$$
$$1 - (1 - q_1)(1 - q_2)\rho_1\rho_2 - (1 - q_1)q_2\rho_1 - q_1(1 - q_2)\rho_2 - q_1q_2.$$

TABLE 3

99% of the packets have a delay less than or equal to the
value in table (normalized to average packet length); 10%
packet loss on Path 1 and 0% packet loss on Path 2.

| Total Load on Path 1: $\rho_1$ | Total Load on Path 2: $\rho_2$ | | | | | |
|---|---|---|---|---|---|---|
| | 10% | 20% | 40% | 60% | 80% | 90% |
| 10% | 0.6 | 1.2 | 2.5 | 4.6 | 10.4 | 22.0 |
| 20% | 0.9 | 1.5 | 2.7 | 4.6 | 10.4 | 22.0 |
| 40% | 1.2 | 1.9 | 3.1 | 5.0 | 10.6 | 22.0 |
| 60% | 1.6 | 2.4 | 3.7 | 5.7 | 10.8 | 22.0 |
| 80% | 2.0 | 2.9 | 4.6 | 7.1 | 12.7 | 22.8 |
| 90% | 2.3 | 3.3 | 5.4 | 8.3 | 15.5 | 26.5 |
| Without Switchover | 2.6 | 3.8 | 6.2 | 10.3 | 22.0 | 45.0 |

Using (9) and (10), Table 3 shows some representative delay tradeoffs when Path 1 with a 10% packet loss rate (i.e., $q_1 = 0.1$) is combined with a loss-free Path 2 (i.e., $q_2 = 0$). Table 3 lists the 99 percentile of the delay X (i.e., 99% of the packets experience a delay less than the value indicated in Table 3) for various loads ($\rho_1$ and $\rho_2$). For comparison, the last row of Table 3 lists the 99 percentile of the Path 2 delay ($X_2$) without any switchover to Path 1. This comparison shows the delay reduction possible with rapid QoS detection and switchover to alternate paths. For instance, if the total load on Path 2 is 40%, then the 99-percentile of the delay is 6.2 (packet lengths) without rapid switchover, whereas it can be reduced to values ranging (in Table 3) from 2.5 to 5.4 with rapid switchover. The amount of delay reduction is obviously dependent on the total load (and corresponding delay) of the alternate Path 1: the higher the load (delay) of Path 1, the smaller the amount of improvement possible with rapidly switching packets from Path 2 over to Path 1. Even though Path 2 is better than Path 1 in terms of packet loss, it still is advantageous to switch some packets over to Path 1 (when its delay is lower).

V. Illustrative Hardware Implementation

Figure 4:
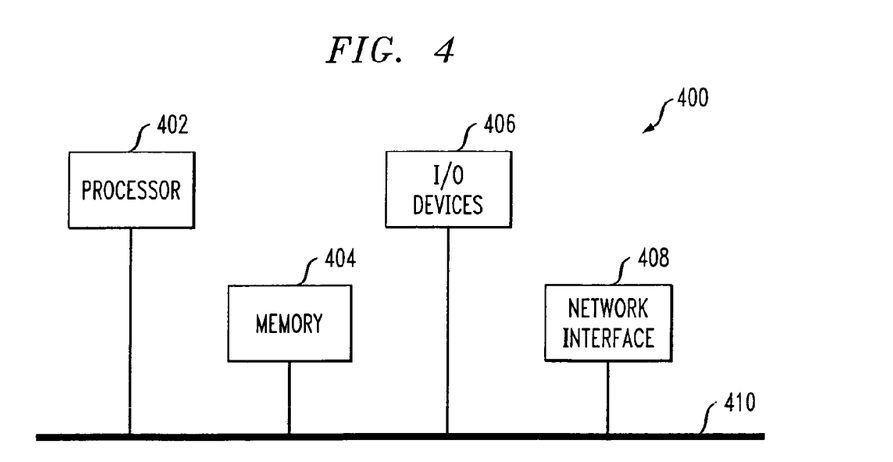
FIG. 4 is a block diagram of a computer system architecture for use in implementing a fault detection and recovery methodology, in accordance with an illustrative embodiment of the present invention.

Referring now to FIG. 4, a block diagram illustrates a generalized hardware architecture of a computer system suitable for implementing techniques described herein, according to an embodiment of the present invention. That is, computer system 400 may represent a server, a router, an edge device, and/or a gateway at a sender site (102 of FIG. 1) or a receiver site (104 of FIG. 1), a PMR device (106 in FIG. 1, 302 in FIG. 3) embedded in one or more of such site components or standalone at a remote location, or any system or device suitable for implementing principles of the invention. Of course, it is to be understood that the invention is not limited to any particular computing system implementation.

In this illustrative implementation, a processor 402 for implementing at least a portion of the methodologies of the invention is operatively coupled to a memory 404, input/output (I/O) devices 406 and a network interface 408 via a bus

410, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit.

Still further, the phrase "network interface" as used herein is intended to include, for example, one or more devices capable of allowing the computing system 400 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of fault detection and recovery systems, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 402.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

VI. Illustrative Summary and Extensions

Accordingly, as has been illustratively described herein, the present invention provides techniques for improving resiliency and QoS of VoIP networks by using inherent redundancy in the network. We presented a new monitoring technique that uses short, low-bandwidth keep-alive packets injected into VoIP streams to rapidly detect faults and network QoS conditions. By emphasizing the notion of monitoring and detection for control, we have presented a scheme that duplicates keep-alive packets strategically to compare primary and secondary network paths and presented methods that more easily compute the differential QoS between two paths avoiding the complexities of timing and synchronization. Errors are also eliminated. We have analytically studied both the goodness of our detection methods by computing false alarm probabilities, and the benefit of our control schemes, by studying the potential performance benefits of switching between paths. Our proposed solution can be encapsulated into a device (we have called PMR) that can be co-located or built into media gateways, enterprise routers or edge devices.

It is to be appreciated that principles of the invention may be used to monitor (and compare) the performance of other traffic types. For instance, if nodes inject "high priority" and "low priority" (indicated in their headers) keep-alive packets, then the jitter of high-priority and low-priority services can be measured.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
transmitting a first packet from a first node to a second node via a path in a telecommunications network, wherein:
  i. a connection is established between the first node and the second node over the path in the telecommunications network,
  ii. the connection is characterized by a transmission of data traffic, wherein the data traffic is transmitted over the path in the telecommunications network,
  iii. the first packet does not form part of the data traffic, and
  iv. the data traffic is characterized by at least one silent period being present in it;
when the first packet is transmitted during a silent period and lost, calculating, at a node in the telecommunications network, a probability measure, wherein:
  i. the probability measure reflects the probability that the connection between the first node and the second node is still operational despite the loss of the first packet, and
  ii. the probability measure depends on:
    A. the expected duration d of the silent period,
    B. the size n of a set of lost packets, wherein: (1) the packets from the set are sent by the first node during the silent period and (2) the first packet is a member of the set, and
    C. an estimate of the probability that during the transmission of k consecutive packets by the first node, n packets will be lost; and
when the probability measure is below a threshold, changing a path over which packets are routed in the telecommunications network.

2. The method of claim 1 wherein the changing operation comprises changing, the path via which packets that are part of the data traffic are routed from the first node to the second node.

3. The method of claim 1 wherein the changing operation comprises changing the content of a routing table that is used by a node in the telecommunications network.

4. The method of claim 1 comprising:
transmitting an indication of the probability measure from the second node to the first node; and
wherein the probability measure is calculated at the second node.

5. The method of claim 1 wherein the probability measure is calculated at the first node.

6. The method of claim 1 wherein the probability measure is calculated at the second node.

* * * * *